June 5, 1945.  F. O. CALVIN ET AL  2,377,756

FILM ACTUATING MECHANISM

Original Filed Jan. 9, 1940

INVENTORS.
Forrest O. Calvin,
William G. Wilson
and Thomas R. Smith
Parkinson & Lane Attys.

Patented June 5, 1945

2,377,756

UNITED STATES PATENT OFFICE 2,377,756

FILM ACTUATING MECHANISM

Forrest O. Calvin, Kansas City, Mo., William G. Wilson, Merriam, Kans., and Thomas R. Smith, Newton, Iowa, assignors to Movie-Mite Corporation, Kansas City, Mo., a corporation of Missouri Original application January 9, 1940, Serial No. 313,088. Divided and this application October 13, 1942, Serial No. 461,838.

1 Claim. (Cl. 271—2.3)

The present invention relates to motion picture apparatus and more particularly to a film actuating mechanism for a motion picture projector. The film path through this projector is so arranged that the film passes over a minimum number of controlling members such as sprockets, rollers, etc. This makes possible very quick and simple threading of the film through the apparatus, and the rolls that support the film around the sprocket are so constructed and arranged that the spring of the film tends to hold it onto the sprocket.

In the present novel embodiment, there is provided a simple and positive means for holding the film sprocket holes in proper engagement with the sprocket teeth and includes a leaf spring mounted against the toothed end of the sprocket. On the spring are fixed suitably shaped pieces or guard blocks which project over the surface of the film between the sprocket holes and the edge of the film. The leaf spring also acts as a lateral guide for the film in threading the apparatus or projector and prevents the film from being pushed past the sprocket by an inexperienced operator. This leaf spring mounting is so constructed and arranged as to permit the pieces or guard blocks to be pushed back so that the sprocket holes in the film may engage the sprocket teeth, after which the spring returns to its original position holding the piece or block over the film edge and thereby preventing the film from rising up or climbing off the sprocket teeth. The present application is a division of our co-pending application Serial No. 313,088, filed January 9, 1940.

The present invention further comprehends a novel actuating mechanism including a single sprocket having multiple functions, the top surface of the sprocket functioning as a pull-down and feed sprocket, and the bottom surface functioning as the sound sprocket in that it pulls the film past the sound aperture as the take-up sprocket, and as the hold-back sprocket.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
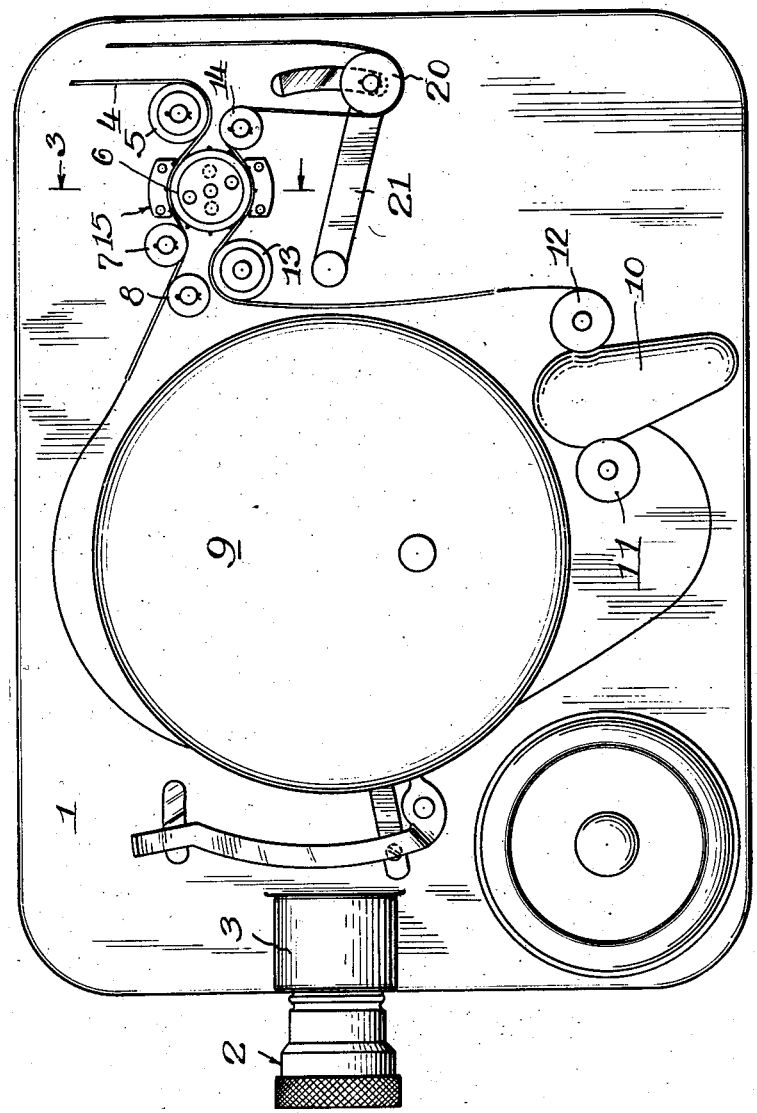
Figure 1 is a view in side elevation of a motion picture apparatus employing the novel construction.
Figure 3:
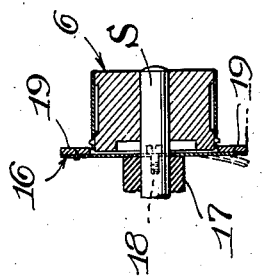
Figure 3 is a fragmentary enlarged view in vertical cross section taken on the line 3—3 of Figure 1.
Figure 2:
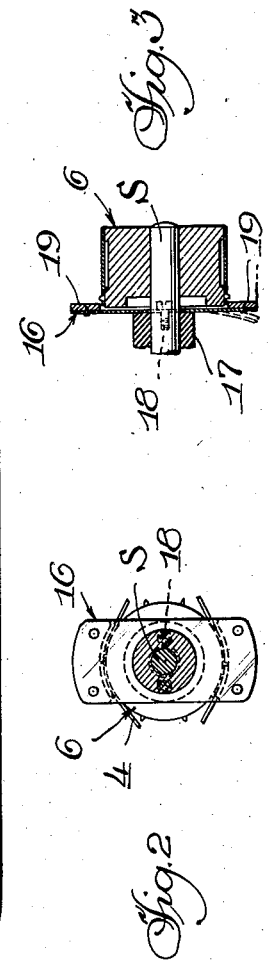
Figure 2 is a view in rear elevation of the sprocket and guard or retainer for the film.

Referring more particularly to the construction disclosed in the drawing, the novel illustrative embodiment disclosed comprises a support or mounting plate 1 upon which is suitably mounted the projecting apparatus. In the forward part of this support is adjustably mounted a lens 2 in a lens mount 3. The film 4 is fed from the feed roll (not shown) over the roller 5 and thence over a sprocket 6 and between guide rollers 7 and 8 to the picture aperture located within the enclosure 9. From the picture aperture the film travels over a sound drum housed within the enclosure 10 and is held against a sound drum by means of a pad roller 11. As it leaves the sound drum, the film is guided over a roller 12 and is passed over a guide roller 13. From there it is passed over the bottom surface of the sprocket 6 and guide roller 14.

In order to hold the film 4 onto the top and bottom of the sprocket 6, the invention comprehends a sprocket retainer 15. The guide rollers 5, 7 and 8 and the guide rollers 13 and 14 are so disposed and arranged that the natural tendency of the film to straighten out from the bends imposed thereon keeps the film on the sprocket. This sprocket retainer or guard 15 comprises a leaf spring 16 mounted behind the sprocket and secured to a bearing or hub 17 for the shaft S by screws or other suitable means 18. Suitable blocks or projecting pieces 19 are fixed to the leaf spring at its opposite ends by means of suitable attaching means such as rivets, solder and the like, so as to project out over the surface of the film from the edge into the sprocket holes.

In the operation of the projector, the film 4 is fed from the feed roll over the roller 5 and thence over the sprocket and between guide rollers 7 and 8 to the projecting apparatus. The film travels in such a path as to require a minimum number of supporting parts or rollers, and these parts or rollers are so placed as to make the film path of such shape that the film will not be subjected to sharp bends or mis-handling.

The film is threaded onto the upper surface of the sprocket 6 by bending the spring 16 backwards and thereby permit the film to slip down over the sprocket teeth past the blocks or projections 19. The spring then returns to its original position, returning the blocks or guards 19 to their operative position over the edge of the film to thereby overcome any tendency of the film to rise up or climb off the sprocket teeth. Similarly, the projecting guard or block 19 located below the sprocket 6 functions to retain the film 4 onto the sprocket teeth as the film passes from the guide roller 13 to the guide roller 14. From the guide roller 14 the film passes over a snubber roller 20 mounted upon a spring control arm 21, and from there this film passes onto a take-up reel (not shown).

Having thus disclosed the invention, we claim:

In a sound motion picture projector, a sprocket for feeding film to and withdrawing it from the projector, and means for holding the film upon the teeth on the upper and lower side of the sprocket and consisting of a leaf spring positioned adjacent the sprocket with a projection on the upper and lower end of the leaf spring extending over an edge of the film as it is fed to and returned from the projector to maintain the film upon the teeth of the sprocket and form a lateral guide for the film thereat, either end of the leaf spring being adapted to be withdrawn to move its projection away from the sprocket to permit the film to be threaded onto its upper or lower side.

FORREST O. CALVIN.
WILLIAM G. WILSON.
THOMAS R. SMITH.